Oct. 14, 1924. 1,511,642

J. J. THACHER

TOOL FEEDING AND TRAVERSING MECHANISM FOR MACHINE TOOLS

Filed July 27, 1921 3 Sheets-Sheet 1

Inventor
J. J. Thacher
By Joseph K. Schofield
Attorney

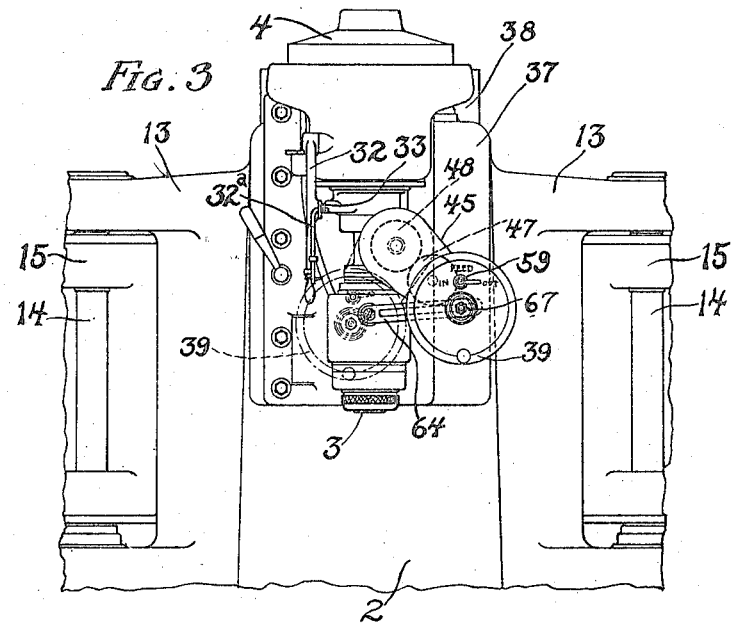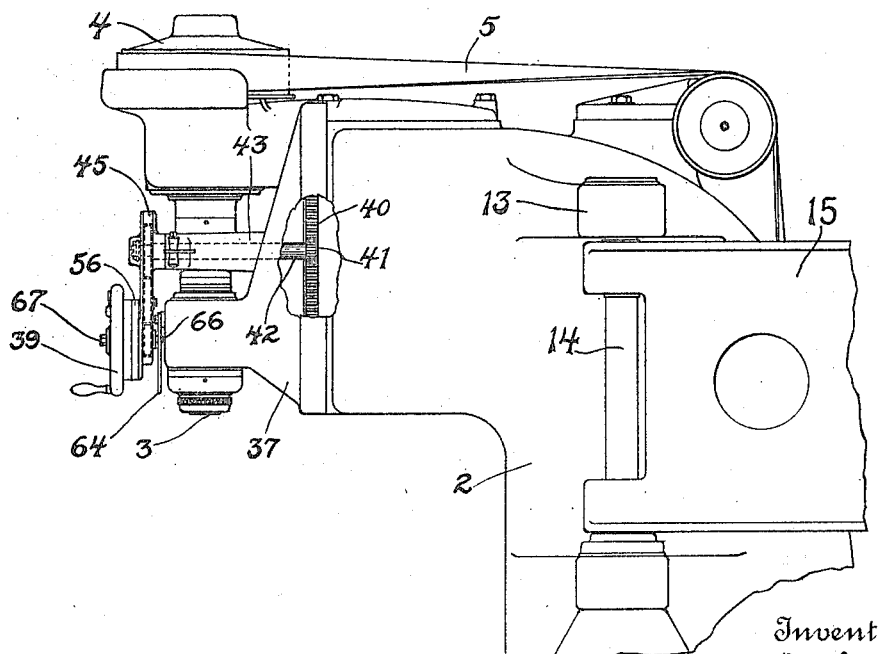

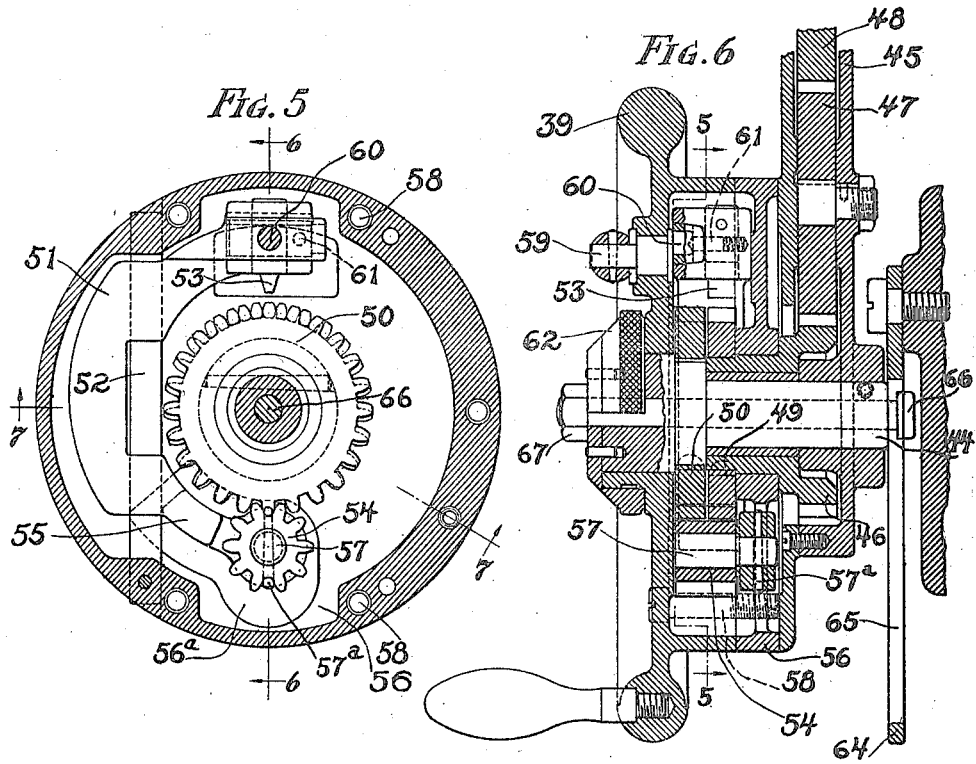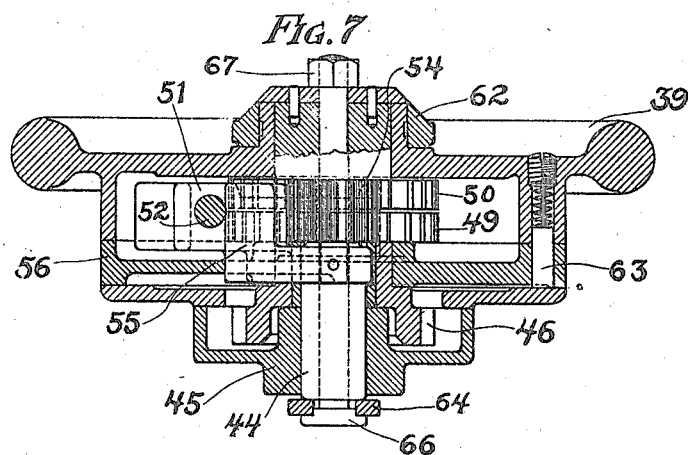

Patented Oct. 14, 1924.

1,511,642

UNITED STATES PATENT OFFICE.

JOHN J. THACHER, OF WETHERSFIELD, CONNECTICUT, ASSIGNOR TO PRATT & WHITNEY COMPANY, OF NEW YORK, N. Y., A CORPORATION OF NEW JERSEY.

TOOL FEEDING AND TRAVERSING MECHANISM FOR MACHINE TOOLS.

Application filed July 27, 1921. Serial No. 487,871.

*To all whom it may concern:*

Be it known that I, JOHN J. THACHER, a citizen of the United States, residing at Wethersfield, in the county of Hartford and State of Connecticut, have invented certain new and useful Improvements in Tool Feeding and Traversing Mechanism for Machine Tools, of which the following is a specification.

This invention relates to machine tools and particularly to an improved mechanism whereby the operator may more conveniently control the movements of the tool and more readily observe the operation thereof on the work. In machines where the tool movements are hand controlled from the front of the machine, it is greatly to the advantage of the operator to have the controlling mechanism as conveniently arranged and as easily operable as possible. It is also essential, particularly in die sinking machines, that the mechanism be so arranged that the operator may readily observe the operation of the cutting tool on the work. It is the primary object of this invention to provide a mechanism which is particularly adapted to perform these functions.

It is an object of the invention to provide, in combination with a tool spindle, a tool controlling hand wheel conveniently arranged adjacent the spindle and means whereby the hand wheel may be adjusted to different positions laterally of the spindle at the convenience of the operator, the hand wheel being adapted to maintain its operative tool controlling connection in its several adjusted positions.

It is another object of the invention to provide in combination with a tool spindle, a tool controlling hand wheel and adjustable means whereby the rotation of the hand wheel may operate to feed the tool slowly or may operate to traverse the tool rapidly.

A further object of the invention is to provide an improved interlocking device in connection with the spindle driving mechanism whereby to prevent the accidental throwing in of the wrong spindle driving means.

With the above and other objects in view, my invention consists in the features of construction and operation set forth in the following specification and illustrated in the accompanying drawings. In such drawings annexed hereto and forming a part of this specification, I have shown my invention embodied in a die sinking machine but it will be understood that the invention can be otherwise embodied and that the drawings are not to be construed as defining or limiting the scope of the invention, the claims appended to this specification being relied upon for that purpose.

Referring to the figures of the drawings:

Fig. 3 is an enlarged fragmentary front elevation of the machine tool showing the tool spindle and saddle vertically slidably mounted on the supporting column.

Fig. 4 is a side elevation thereof.

Fig. 5 is an enlarged detail cross sectional view through a portion of the tool feeding mechanism, such view being taken on line 5—5 of Fig. 6.

Fig. 6 is a longitudinal sectional view thereof taken on the line 6—6 of Fig. 5.

Fig. 7 is a longitudinal sectional view taken on the line 7—7 of Fig. 5, certain inner parts thereof being shown in elevation.

Figure 1:
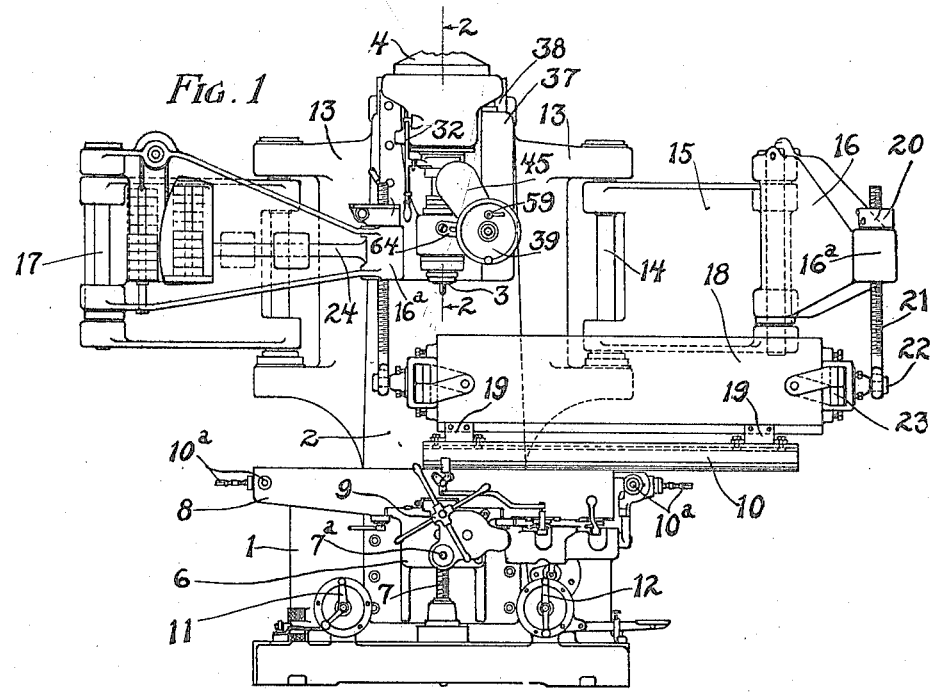
Figure 1 is a front elevation of a machine embodying my invention.

Referring more specifically to the drawings by reference characters, 1 designates the base and 2 the column of a vertical milling or die sinking machine. The tool spindle 3 is rotated by a pulley 4 from a belt 5. A knee 6 is supported on the base and is vertically adjustable thereon by means of a screw 7. A saddle 8 is supported on the knee and may be moved backward and forward thereon by a hand means 9. A table 10 is mounted for longitudinal sliding movement on the saddle. Studs 7$^a$ and 10$^a$ are provided to receive the hand means 9 thereon for moving the knee and table respectively by hand. It will be understood that the knee, saddle and table may all be operated either by power or hand. Means 11 and 12 are provided at the front of the machine for controlling the tool rotating speeds and the table operating speeds respectively. Since the portion of the machine thus far described does not within itself comprise a part of this invention, further description thereof will be omitted herein, it being understood, however, that the table and its supporting members are adapted to be operated either by hand or automatically.

Projecting from each side of the column are fixed brackets 13, and supported on each pair of these brackets and pivotally connected thereto by a pin 14 is an articulated arm, comprising an inner member 15 and an outer member 16 which are hinged together by a pin 17. These arms are given the necessary shape to provide the requisite strength to sustain the stresses to which they will be subjected and are desirably made hollow so as to eliminate as much weight as possible.

At the outer ends of the outer members of the arms are means designed to be attached to the block of metal 18 in which the die is to be cut, this block being fastened by suitable clamps 19 to the top of the table. The means illustrated for supporting the ends of the die stock consists of a sleeve 20 which is loosely mounted in the end of each arm and has an interior thread through which passes a threaded rod 21. The lower end of the rod 21 is provided with an eye for receiving the stud 22 which is fastened to the end of the die stock by clamping means 23. This clamp is illustrated and described in detail in a copending application to Louis G. Bayrer, Serial No. 415,557, filed August 8th, 1920. The sleeve may be rotated for raising or lowering the threaded supporting rod whereby to exert an upward force on the die stock. Such sleeve is free to have a slight vertical movement in the opening in the outer end of the arm. A counterbalancing mechanism comprising a lever 24 is adapted to support the sleeve and rod in a manner to relieve the table of the greater portion of the weight of the work. This mechanism is more fully described and illustrated in Patent No. 1,329,358 to Louis G. Bayrer and in a copending application to Louis G. Bayrer, Serial No. 498,834 filed September 6, 1921.

Figure 2:
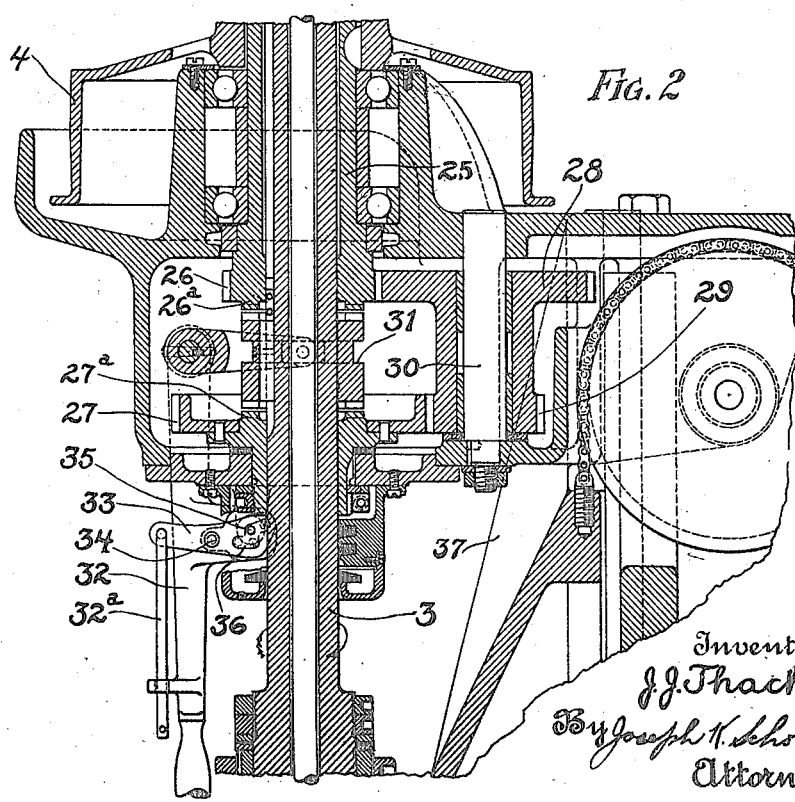
Fig. 2 is a fragmentary vertical sectional view of the spindle and its driving mechanism taken on the line 2—2 of Fig. 1.

In Fig. 2 is illustrated means for driving the spindle at two relatively different speeds, such means comprising a sleeve 25 loose on the spindle and keyed to the pulley 4, the sleeve being provided at its lower end with a gear 26 and clutch teeth 26ª. A second clutch gear 27 having clutch teeth 27ª is also loosely mounted on the spindle. The gear 27 is driven from the gear 26 through reduction gears 28 and 29 on a shaft 30. A clutch 31 is splined to the spindle between the gears 26 and 27 and the clutch may be operatively engaged with either gear by means of a hand lever 32. It will be noted that gears 26 and 27 are adapted to rotate in the same direction at different speeds. Engagement of the clutch with gear 26 is adapted to drive the spindle directly from the pulley 4 and engagement of the clutch with gear 27 is adapted to drive the spindle at a reduced speed.

In operation, the proper spindle speed usually depends on the work being performed and the size of tool being used, a single speed quite commonly being used throughout any particular milling or die-sinking operation. In operating the machine, the operator will have occasion to throw the clutch 31 from an operative to a neutral position and will thereafter desire to place the clutch in its former position to rotate the spindle at the same speed. Should the operator forget in which direction the lever 32 should be thrown to obtain such speed, he might accidently throw the same the wrong way and thereby operate the spindle at the other speed. A simple interlocking device has been provided to prevent such an occurrence. As illustrated, this device comprises a plate 33 pivoted at 34 to the lever 32. A pin 35 on the spindle support engages in a slot or recess 36 in the plate. In Fig. 2, the clutch is shown in a neutral position and the interlocking plate 33 is in a position only permitting the lever 32 to be drawn outwardly to throw the clutch into engagement with the gear 27 to rotate the spindle relatively slow. With the interlocking plate in this position, the clutch can only be moved between the neutral position and the position throwing the spindle into operative engagement with the gear 27. Should the operator desire to throw the clutch into the relatively fast speed or direct drive for the spindle (gear 26), the rod 32ª is drawn downwardly to engage the pin in the lower portion of the recess 36 whereupon the lever can only be moved between the neutral position and the position throwing the spindle into operative engagement with gear 26. In such manner, the accidental throwing into operation of the wrong spindle driving gear is positively prevented.

The tool spindle 3 is mounted vertically in a saddle 37 vertically adjustable on a guideway 38 of the column. A hand wheel 39 is provided for moving the saddle vertically. In operating the machine, the operator normally stands directly in front of the tool spindle and it is essential in die-sinking operations that the mechanism be so arranged that he may readily observe the operation of the cutting tool on the work. Arrangement of the hand wheel directly in front of the spindle would obscure the vision of the operator relative to the tool. Also, as illustrated in Fig. 1, the hand wheel cannot well be permanently positioned at either side of the spindle since the same would at times interfere with the movement of the end 16ª of one or the other of the work supporting arms 16. Therefore to secure the advantage of a hand wheel positioned laterally of the spindle without interfering with either work supporting arm 16, I make the hand wheel laterally adjustable as illustrated in Figs. 1 and 3 whereby the hand wheel may be positioned at either side of the spindle as may be desired. In addition to the advantages enumerated, this adjustment also provides for easy operation thereof by either a right or left handed operator.

The saddle moving mechanism operated from the hand wheel preferably comprises a rack 40 on the column and an engaging pinion 41 is secured to the end of a shaft 42 rotatable in a bearing 43. The hand wheel and the cooperating gears coaxial therewith (Fig. 6) are supported on a pin 44 seated in the lower end of a gear housing 45 hung to the end of shaft 42. A train of gears comprising a pinion 46 on the pin 44, an intermediate gear 47 and gear 48 secured to the end of shaft 42 provide an operative connection from the hand wheel to the rack pinion 41.

Mechanism illustrated in Figs. 5, 6 and 7 is provided for direct rotation of the pinion 46 from the hand wheel or rotation thereof from the hand wheel at a reduced speed. This mechanism comprises a 25-toothed gear 49 keyed to the pinion 46 and 24-toothed gear 50 keyed to the non-rotatable pin 44. A yoke 51 is slidably mounted on a transverse pin 52 within the hand wheel. A tooth 53 on one end of the yoke is adapted to be engaged between two adjacent teeth of the the gear 49 and a pinion 54 on the other end of the yoke is adapted to be engaged with both gears 49 and 50. It will be noted that the pinion end of the yoke is offset at 55 to enter a recess 56$^a$ in a rotatable plate 56 at the back of the hand wheel, the pinion being mounted on a stud 57 pinned to the yoke at 57$^a$. Bolts 58 are provided for securing the hand wheel and plate 56 together. The yoke may be moved on the pin 52 for engaging either the tooth 53 with gear 49 or pinion 54 with gears 49 and 50 by means of a hand latch 59 on the hand wheel. This latch operates an eccentric 60 to slide the yoke and a spring-pressed pin 61 is adapted to hold the yoke in either of its extreme positions.

A dial 62 rotatable with the hand wheel may be used for indicating the feeding movement of the tool when desired. A spring pressed friction shoe 63 is provided in the hand wheel for preventing free idle movement of the hand wheel. A slotted link 64 is pivoted to the saddle and its slotted portion 65 is engaged by a bolt 66 within the pin 44. After laterally adjusting the hand wheel, the same may be secured in such position by tightening the nut 67 on the bolt 66.

In operation, the engagement of the tooth 53 with gear 49 provides for a direct rotation of the rack pinion 41 and vertical movement of the saddle at a relatively fast traversing speed. Engagement of the pinion 54 with gears 49 and 50 provides a differential action whereby the gear 49 is rotated the distance of one tooth or $\frac{1}{25}$ of a rotation for each rotation of the hand wheel, such rotation of the gear 49 being in the same direction as the rotation of the hand wheel. The action of this mechanism will be clearer by noting that the pinion 54 in travelling clockwise around gear 50 (Figs. 5 and 6) rotates twenty-four teeth in a clockwise direction, the gear 49, however, having twenty-five teeth is necessarily forced ahead (in a clockwise direction) one tooth. The feeding and traversing movements of the tool from the hand wheel are therefore illustrated as being in the ratio of 1 to 25 respectively. It will be noted that in operation, the lateral adjustment of the hand wheel in no way disturbs either the feeding or traversing connection from the hand wheel to the rack pinion.

What I claim is:

1. In a machine tool, the combination of a support, a tool spindle, a member supporting the spindle for sliding movement on the support, a rotary element for sliding the spindle, a gear secured on the element for rotation therewith, a second gear non-rotatably mounted adjacent and coaxial of the first gear, a hand wheel, and mechanism for connecting the hand wheel with the first said gear for directly rotating the same and the said element or for operatively connecting the hand wheel with both said gears for indirectly rotating the said element at a different speed.

2. In a machine tool, the combination of a support, a tool spindle, a member supporting the spindle for sliding movement on the support, a rotary element for sliding the spindle, a gear secured on the element for rotation therewith, a second gear non-rotatably mounted adjacent and coaxial of the first gear, the second gear having a less number of teeth than the first gear, a hand wheel, a tooth and a relatively wide pinion on the hand wheel, and means for either engaging the tooth with the first gear to directly connect the hand wheel thereto or for meshing the pinion with both gears to drive the second gear from the hand wheel at a reduced speed.

3. In a machine tool, the combination of a support, a tool spindle, a member supporting the spindle for sliding movement on the support, a rotary element for sliding the spindle, a gear secured on the element for rotation therewith, a second gear non-rotatably mounted adjacent and coaxial of the first gear, the second gear having a less number of teeth than the first gear, a hand wheel, a yoke on the hand wheel, a tooth and a relatively wide pinion on the yoke, and means for shifting the yoke to either engage the tooth with the first gear to directly connect the hand wheel thereto or to mesh the pinion with both gears to drive the second gear from the hand wheel at a reduced speed.

4. In a machine tool, the combination of a support, a tool spindle, a member supporting the spindle for sliding movement on the support, means comprising a rack on the support and a pinion on the member and in engagement with the rack for sliding the member on the support, a hand wheel for operating the pinion, two gears coaxial of the hand wheel, one of said gears being operatively connected to the rack pinion and the other gear being non-rotatable and having a different number of teeth than the first gear, pinion means secured to the hand wheel and adapted to be meshed with the said two gears for slowly sliding the member upon rotation of the hand wheel, and means for disengaging the said pinion means and engaging the hand wheel in direct connection with the first gear for giving the member a relatively fast traversing movement upon rotation of the hand wheel.

5. In a machine tool, the combination of a column, a saddle slidably mounted on the column, a tool spindle rotatably mounted in the saddle, means comprising a rack on the column and a pinion on the saddle in engagement with the rack for moving the saddle on the column, a hand wheel at the front of the saddle for operating the pinion, two gears coaxial of the hand wheel, one of such gears being operatively connected to the rack pinion and the other gear being non-rotatable and having a different number of teeth than the first gear, pinion means secured to the hand wheel and adapted to be meshed with the said two gears for slowly rotating the first gear and feeding the saddle slowly upon rotation of the hand wheel, and means on the hand wheel for disengaging the said pinion means and engaging the hand wheel in direct connection with the first gear for giving the saddle a relatively fast traversing movement upon rotation of the hand wheel.

6. In a machine tool, the combination of a support, a tool spindle, a member supporting the spindle for a vertical sliding movement on the support, mechanism comprising a single hand wheel at the front of the member for sliding the member on the support, and means permitting the lateral adjustment of the hand wheel at the convenience of the operator, the operative member-sliding connection of the hand wheel being adapted to be maintained in different positions of the said lateral adjustment.

7. In a machine tool, the combination of a column, a saddle vertically slidably mounted on the column, a tool spindle rotatably mounted in the saddle, means comprising a rack on the column and a pinion on the saddle in engagement with the rack for moving the saddle vertically on the column, a hand wheel at the front of the saddle for operating the pinion, and an operative connection between the hand wheel and pinion, the said connection being of such a character as to permit the lateral adjustment of the hand wheel at the convenience of the operator, the operative connection between the hand wheel and pinion being adapted to be maintained in different positions of the said lateral adjustment.

8. In a machine tool, the combination of a column, a saddle vertically slidably mounted on the column, a tool spindle vertically mounted in the saddle, means comprising a rack on the column and a pinion on the saddle in engagement with the rack for moving the saddle vertically on the column, a hand wheel at the front of the saddle for operating the pinion, and means comprising a plurality of intermeshing gears operatively connecting the hand wheel with the rack pinion, the said connection being of such a character as to permit the lateral bodily adjustment of the hand wheel in an arcuate path at the convenience of the operator, the operative connection between the hand wheel and pinion being adapted to be maintained in different positions of the said lateral adjustment.

9. In a machine tool, the combination of a column, a saddle vertically slidably mounted on the column, a tool spindle mounted in the saddle, means comprising a rack on the column and a pinion on the saddle in engagement with the rack for moving the saddle vertically on the column, a hand wheel at the front of the saddle for operating the pinion, means comprising a plurality of intermeshing gears operatively connecting the hand wheel with the rack pinion, the said connection being of such a character as to permit the lateral bodily adjustment of the hand wheel in an arcuate path about the pinion axis as a center at the convenience of the operator, the operative connection between the hand wheel and pinion being adapted to be maintained in all positions of the said lateral adjustment, and means for securing the hand wheel in its adjusted positions.

10. In a machine tool, the combination of a support, a tool spindle, a member supporting the spindle for a vertical sliding movement on the support, mechanism comprising a single hand wheel at the front of the member for sliding the member either relatively slow or fast on the support, means for adjusting the mechanism to obtain either the slow or fast movement upon rotation of the hand wheel, and means permitting the lateral adjustment of the hand wheel at the convenience of the operator, the operative member-sliding connection of the hand wheel being adapted to be maintained in different positions of the said lateral adjustment.

11. In a machine tool, the combination of a support, a saddle vertically slidably mounted on the support, a tool spindle rotatably mounted in the saddle, means comprising a rack on the support and a pinion on the saddle in engagement with the rack for moving the saddle vertically in the support, a hand wheel at the front of the saddle for operating the pinion, operating means between the hand wheel and pinion whereby rotation of the hand wheel rotates the pinion either relatively slow or fast, and means for adjusting the said operating mechanism to obtain either the slow or fast movement upon rotation of the hand wheel, the connection between the hand wheel and pinion being of such a character as to permit a lateral adjustment of the hand wheel at the convenience of the operator, the operative connection between the hand wheel and pinion being adapted to be maintained in different positions of the said lateral adjustment.

12. In a machine tool, the combination of a column, a saddle vertically slidably mounted on the column, a tool spindle rotatably mounted in the saddle, means comprising a rack on the column and a pinion on the saddle in engagement with the rack for moving the saddle vertically on the column, a hand wheel at the front of the saddle for operating the pinion, differential gearing between the hand wheel and pinion whereby rotation of the hand wheel rotates the pinion relatively slow for feeding, and an adjusting means for disengaging the differential gearing and engaging the hand wheel in direct connection with the pinion for giving a relatively fast traversing movement, the connection between the hand wheel and rack pinion being of such a character as to permit a bodily adjustment of the hand wheel in an arcuate path at the convenience of the operator, the operative connection between the hand wheel and pinion being adapted to be maintained in all positions of the said lateral adjustment.

13. In a machine tool, the combination of a column, a tool spindle mounted on the column, a work table movable below the spindle, mechanism for feeding the table horizontally, work-supporting means adapted to move above the table, means supporting the spindle for vertical sliding movement on the column, mechanism comprising a single hand wheel at the front of the spindle for sliding the spindle vertically, and means permitting the lateral adjustment of the hand wheel to position the same to one side of the spindle free from interference with the said work-supporting means, the hand wheel being adapted to retain its spindle sliding connection in different positions of the said lateral adjustment.

14. In a machine tool, the combination of a column, a saddle vertically slidably mounted on the column, a tool spindle rotatably mounted in the saddle, a work table movable below the spindle, mechanism for feeding the table horizontally, articulated work-supporting arms pivotally mounted on the column and adapted to swing above the table, means comprising a hand wheel at the front of the saddle for moving the saddle vertically on the column, and means permitting the lateral adjustment of the hand wheel to position the same to one side of the spindle free from interference with the said arms, the hand wheel being adapted to retain its saddle sliding connection in different positions of the said lateral adjustment.

15. In a machine tool, the combination of a column, a saddle vertically slidably mounted on the column, a tool spindle rotatably mounted in the saddle, a work table movable below the spindle, mechanism for feeding the table horizontally, articulated work-supporting arms pivotally mounted on the column and adapted to swing above the table, means comprising a rack on the column, and a pinion on the saddle in engagement with the rack for moving the saddle vertically on the column, a hand wheel at the front of the saddle for operating the pinion, and means comprising a plurality of intermeshing gears operatively connecting the hand wheel with the rack pinion, the said connection being of such a character as to permit the lateral bodily adjustment of the hand wheel in an arcuate path to position the same to one side of the spindle free from interference with the said arms, the hand wheel being adapted to retain its saddle sliding connection in different positions of the said lateral adjustment.

16. In a machine tool, the combination of a spindle, a plurality of driving elements relatively rotatable at different speeds for driving the spindle, clutch means for engaging the spindle in driving connection with any one of such elements, and an interlocking device adapted to permit the movement of the clutch means only between a neutral position and a position engaging one of the driving elements, the interlocking device being adjustable to permit such engagement with any one of the driving elements.

17. In a machine tool, the combination of a spindle, a pair of driving elements for the spindle, a clutch between the driving elements for engaging the spindle in driving connection with either element, and an interlocking device adapted to permit the movement of the clutch only between a neutral position and a position engaging one of the driving elements, the interlocking device being adjustable to permit such engagement with either driving element.

18. In a machine tool, the combination of a spindle, a pair of driving elements loose on the spindle, a clutch splined to the spindle between the elements for engaging the spindle in driving connection with either element, a handle for shifting the clutch, and an interlocking device comprising a pin and slot connection between the handle and spindle support adapted to permit the movement of the clutch only between a neutral position and a position engaging one of the driving elements, the interlocking device being adjustable to permit such engagement with either driving element.

In testimony whereof, I hereto affix my signature.

JOHN J. THACHER.